(12) United States Patent
van Strien et al.

(10) Patent No.: US 7,641,800 B2
(45) Date of Patent: Jan. 5, 2010

(54) USE OF AN ADSORBENT FOR THE REMOVAL OF LIQUID, GASEOUS AND/OR DISSOLVED CONSTITUENTS FROM A PROCESS STREAM

(75) Inventors: Cornelis Johannes Govardus van Strien, Elst (NL); Elwin Schomaker, Arnhem (NL)

(73) Assignee: OTV S.A., Saint-Maurice (FR)

( * ) Notice: Subject to any disclaimer, the term of this patent is extended or adjusted under 35 U.S.C. 154(b) by 487 days.

(21) Appl. No.: 11/165,781

(22) Filed: Jun. 24, 2005

(65) Prior Publication Data

US 2006/0011543 A1 Jan. 19, 2006

Related U.S. Application Data

(63) Continuation-in-part of application No. 10/344,543, filed as application No. PCT/EP01/09459 on Aug. 15, 2001, now abandoned.

(30) Foreign Application Priority Data

Aug. 18, 2000 (NL) ..................................... 1015961

(51) Int. Cl.
  *B01D 15/00* (2006.01)
(52) U.S. Cl. ....................................... 210/670; 210/679
(58) Field of Classification Search .................. 210/634, 210/635, 656, 660, 671, 673, 679, 680, 690–694; 95/84, 92
See application file for complete search history.

(56) References Cited

U.S. PATENT DOCUMENTS

| | | | | |
|---|---|---|---|---|
| 3,891,680 A | * | 6/1975 | Katsumoto et al. | 549/262 |
| 3,960,762 A | | 6/1976 | Kroebel et al. | 252/426 |
| 4,276,179 A | * | 6/1981 | Soehngen | 210/679 |
| 4,708,721 A | * | 11/1987 | Ehrler | 95/180 |
| 4,711,863 A | | 12/1987 | Streat et al. | 502/5 |
| 4,842,745 A | | 6/1989 | Weiler et al. | 210/679 |
| 5,102,512 A | | 4/1992 | Lamerant | 204/105 |
| 5,192,341 A | * | 3/1993 | Ehrler | 95/189 |
| 5,750,030 A | * | 5/1998 | Schomaker et al. | 210/679 |
| 6,764,603 B2 | * | 7/2004 | Buijtenhuijs et al. | 210/671 |
| 2003/0159995 A1 | * | 8/2003 | Van Strien et al. | 210/660 |

FOREIGN PATENT DOCUMENTS

| | | |
|---|---|---|
| EP | 761 304 | 3/1997 |
| GB | 1 535 481 | 12/1978 |
| WO | 91/05859 | 5/1991 |
| WO | WO 94/03249 | * 2/1994 |

* cited by examiner

*Primary Examiner*—Matthew O Savage
(74) *Attorney, Agent, or Firm*—Coats & Bennett, P.L.L.C

(57) ABSTRACT

A process for the removal of liquid, gaseous and/or dissolved constituents from a process stream. The process stream is contacted with an adsorbent comprising a first porous material which has been incorporated into a second porous material at least 30 vol. % of the pores of the first and second porous materials of which are filled with an extraction liquid. The affinity between the adsorbent and the constituents to be removed exceeds the affinity between the constituents and the extraction liquid.

12 Claims, 6 Drawing Sheets

USE OF AN ADSORBENT FOR THE REMOVAL OF LIQUID, GASEOUS AND/OR DISSOLVED CONSTITUENTS FROM A PROCESS STREAM

CROSS REFERENCE TO RELATED APPLICATIONS

This application is a Continuation-In-Part of application Ser. No. 10/344,543, filed Apr. 11, 2003, now abandoned, which is a national phase filing of PCT International Application Serial No. PCT/EP 01/09459, filed Aug. 15, 2001, which claims priority from Dutch Patent Application Serial No. 1015961, filed Aug. 18, 2000, all of which are incorporated herein in their entirety.

BACKGROUND OF THE INVENTION

1. Field of the Invention

The invention pertains to the use of an adsorbent for the removal of liquid, gaseous and/or dissolved constituents from a process stream.

2. Prior Art

The above use is generally known and widely employed in chemical engineering. One well-known example is the use of a column filled with activated carbon for the removal of, say, aromatic and/or chlorinated hydrocarbons from a process stream. Once the activated carbon in the column has become saturated, it is generally replaced by fresh activated carbon, while the saturated carbon is reactivated. Meanwhile it has been found that several synthetic adsorbents can be regenerated a number of times with, say, steam.

A major drawback to the known process is that it is susceptible to certain inorganic contaminants which are commonly found in very minute concentration, in, say, groundwater to be treated, such as compounds of iron, manganese, calcium, and magnesium which in themselves are not harmful and so do not need to be removed, yet which nevertheless, in the course of time, may lead to fouling of the adsorbent because a substantial part of its surface area will be covered with said contaminants. To overcome the aforementioned problem it has been proposed in WO 94/03249 that instead of particles having adsorbent properties, particles having extracting properties be used. The extracting particles having a particle size in the range of 0.1 to 10 mm have pores with a diameter of 0.01 to 50 µm with an extraction liquid immobilised therein.

Although better results can be achieved with these particles, especially after long-term use, than with the well-known adsorbents because of the extracting particles showing no tendency to fouling or a much lower one, the adsorption capacity of adsorbing materials, especially when the overall concentration of the constituents to be removed does not exceed more than about 100 ppm, as a rule is higher than that of the extracting synthetic particles described above. Consequently, a column containing adsorbents such as activated carbon can be much smaller in size than a column filled with extracting synthetic particles to achieve the same result. For that reason there is great need for an adsorbent which combines the advantages of a higher capacity and a lower tendency to fouling, such as is present in extracting synthetic particles.

The invention provides for the use of an adsorbent for the removal of liquid, gaseous and/or dissolved constituents from a process stream which obviates wholly or for the most part the problems which occur when using the known adsorbents.

SUMMARY OF THE INVENTION

In one embodiment, the invention is a process for the removal of liquid, gaseous and/or dissolved constituents from a process stream, comprising contacting the process stream with an adsorbent comprising a first porous material which has been incorporated into a second porous material at least 30 vol. % of the pores of the first and second porous materials of which are filled with an extraction liquid. The affinity between the adsorbent and the constituents to be removed exceeds the affinity between the constituents and the extraction liquid.

Other embodiments of the invention relate to details including composition of the adsorbent and extraction liquid, relative amounts of porous material and extraction liquid, degree to which the pores of the first and second porous material are filled with extraction are filled with extraction liquid, and various other details, all of which are hereinafter discussed and illustrated.

DETAILED DESCRIPTION OF THE INVENTION

Figure 1:
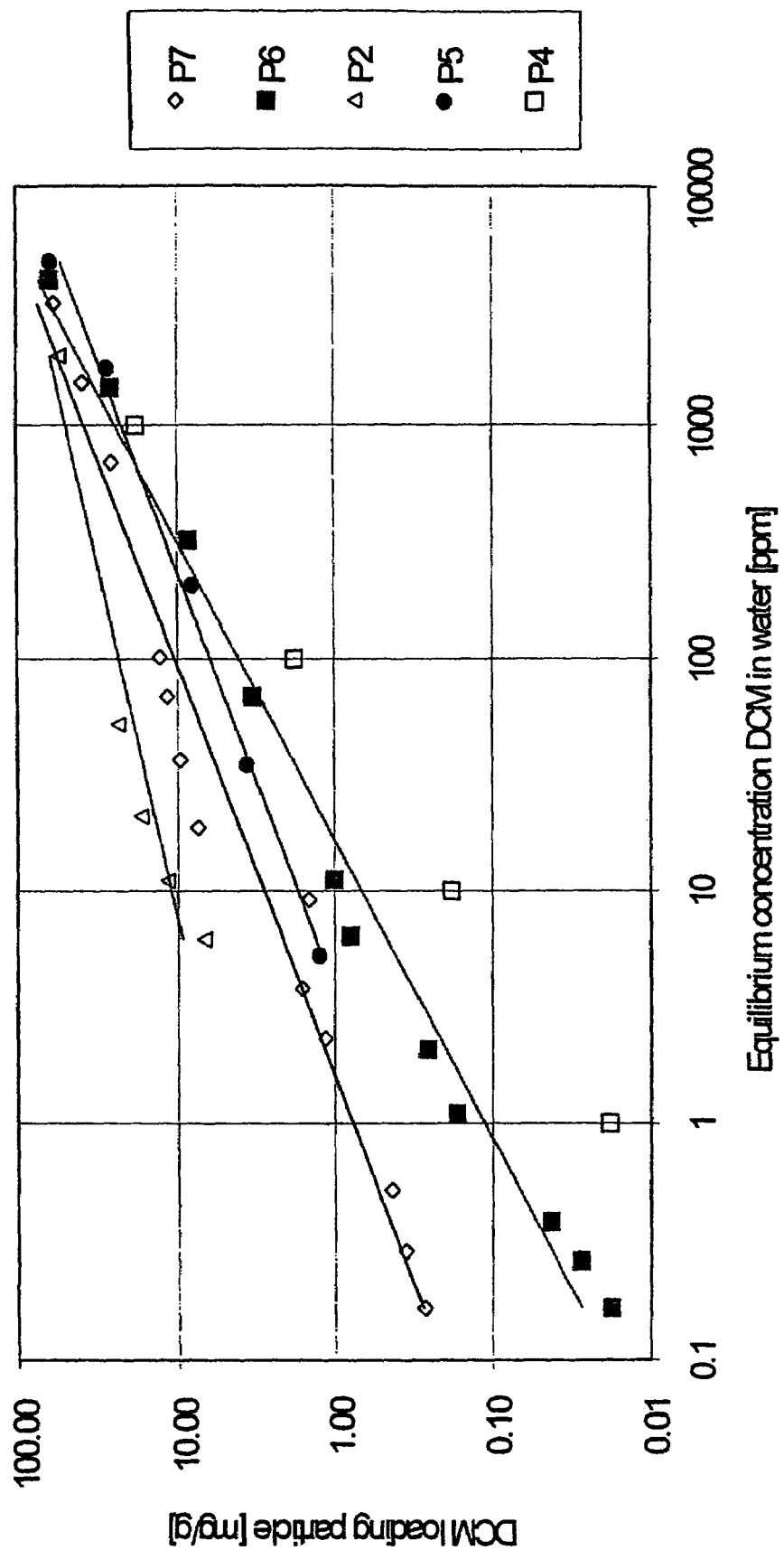
FIG. 1 presents the results of measurements associated with Example 1.

Extraction liquids are used to extract dissolved constituents or to absorb gaseous constituents. Liquids eligible for use as extraction liquid are known to the skilled person. In the case of liquid/liquid-extraction these generally are liquids with minimal solubility in the medium to be extracted. As a rule, the solubility of these liquids in the medium to be extracted is not more than 100 g per 1,000 ml.

Very favourable results can be attained using a material at least 50 vol. % of all the pores of which (both the first and second porous materials) are filled with extraction liquid. However, preference is given to a material at least 90 vol. % of the pores of which are filled with extraction liquid.

The effect of filling the pores with extraction liquid is that when use is made of a porous adsorbent such as activated carbon, its active surface is no longer or virtually no longer subject to deactivation. Surprisingly, it has been found in this connection that the adsorbent properties of this surface area remain intact wholly or for the most part despite its being covered wholly or for the most part with extraction liquid. Since the extracting capacity of the extraction liquid remains completely intact, smaller waste treatment plants will suffice for the now proposed use.

When use is made of an adsorbent which has been incorporated into a porous material of a different composition, the material having the different composition generally will be a polymeric matrix of the same composition as described in WO 94/03249. In that case preference is given to a porous material where the weight percentage of adsorbent calculated on the overall solids content is at least 2.5 wt.%.

A large number of adsorbents are eligible for use according to the invention. As examples may be mentioned activated carbon, carbon black, synthetic particles based on a wide range of polymers, porous inorganic materials modified with organic substituents or not, such as: porous silica or titania, zeolites such as molecular sieves, silica gels, porous alumina including the activated types, and clay particles including the exfoliated types. As yet, optimum results have been achieved using an adsorbent selected from the group of activated carbon, zeolites, carbonised sulphonated cross-linked polystyrene, and cross-linked polystyrene.

When the adsorbent comprising the first porous material is incorporated into a second porous material, preference is given to a material obtained by dissolving a polymer in one or more liquid and miscible compounds at a temperature above the upper critical phase separation temperature Tc in the presence of 2.5 to 80 wt. %, calculated on the overall solids content, of a material with adsorbent properties which is solid at said temperature, followed by a lowering of the temperature and the forming of a fibre, film, granulate or powder from the polymer filled with the liquid compounds, optionally followed by the removal of at least part of the liquid therefrom and by refilling or filling up with an extraction liquid to at least 30% of the pore volume. In that case preference is given to a porous material where the weight percentage of the adsorbent is 10 to 70 wt. % and preferably 20 to 60 wt. % of the overall solids content.

The adsorbent or the second porous material into which the adsorbent has been incorporated may be present in the form of a granulate or powder having a particle size of 0.1 to 10 mm.

As a rule, optimum results are attained with a weight ratio of adsorbent to extraction liquid in the range of 1/10 to 2/1.

The extraction liquid which is suitable for use according to the invention is a liquid which has the highest possible affinity for the organic constituents to be extracted. Of course, this liquid should be virtually insoluble in the aqueous solution to be treated and should be immobilised in the porous material in such a way that it is unable to flow from the pores. According to the invention, favourable results have been attained using a liquid in the form of a glycerol ester of one or more, preferably unsaturated fatty acids.

As a rule, favourable results are attained when the immobilised liquid is an oil, such as palm oil, olive oil, peanut oil, paraffin oil, fish oil such as herring oil, linseed oil, and especially soybean oil and/or castor oil. Optimum results have been attained using paraffin oil and a dialkyl phthalate with an alkyl group having 8 to 16 carbon atoms.

Examples of polymers into which the adsorbent can be incorporated are: low-pressure polyethene, high-pressure polyethene, polypropylene, polystyrene, acrylonitrile-butadiene-styrene terpolymers, styrene-acrylonitrile copolymers, styrene-butadiene copolymers, poly(4-methyl-pentene-1), and polybutene.

Optimum results have been attained using polyolefin-based polymers. In that case preference is given to the use of a porous material based on polypropylene.

The thus combined porous material can be used in the form of a fibre, film, granulate or powder, with preference being given to use in the form of a granulate or powder having an average particle diameter of 0.1 to 10 mm. In this form the material is generally introduced into a column as a packing material. As soon as the concentration of the constituent to be extracted has reached a certain value in the process stream exiting the column, the process stream supply is halted and the process stream is passed to a column connected in parallel. In the meantime, the material saturated with the constituent to be extracted can be regenerated.

The principal parameters determining the effectiveness of a column filled with particles with a liquid extraction medium immobilised therein are the equilibrium constant of the distribution of the substance to be extracted over the continuous phase to be extracted and the immobilised phase and the mass transfer rate.

On the basis of the examples below it will be shown that there is no or virtually no loss of capacity of the oil-filled adsorbents in relation to adsorbents without any oil incorporated therein, while the risk of potential fouling has all but disappeared. By comparing the effectiveness of two columns one of which is filled with extracting synthetic particles without adsorbent while the other is filled with extracting synthetic particles with adsorbent, it is further shown that in a column containing the latter particles it took much longer until there was breakthrough.

Preparation of Oil-Filled Adsorbents Suitable for Use According to the Invention In a rotary vacuum evaporator the pores of a number of adsorbents were filled with oil, with as much oil being added each time as was commensurate with the pore volume of the adsorbent in question. The filling took place at a temperature of 70° C. and under a pressure of less than 50 mbar. The filling time was highly dependent on the type of adsorbent and the selected pressure and ranged from 30 minutes to 12 hours.

Diisodecyl phthalate was selected as the oil, and the selected adsorbents were:

Ambersorb® 563, black spherical beads with a specific surface area of 550 $m^2/g$ (ex Rohm and Haas Co.), activated carbon SA Super® (ex Nor it), and XAD-4® (ex Rohm and Haas), a copolymer of styrene and divinyl benzene.

The composition of the oil-filled adsorbents is listed in Table 1.

TABLE 1

| type with oil-filled adsorbent | adsorbent | wt. % of adsorbent | wt. % of diisodecyl phthalate |
|---|---|---|---|
| P1 | Ambersorb ® 563 | 66.2 | 33.8 |
| P2 | activated carbon SA Super ® | 42.5 | 57.5 |
| P3 | XAD-4 ® | 50 | 50 |

The preparation of an oil-filled synthetic granulate based on polypropylene, hereinafter referred to as P4, was carried out in a manner corresponding to that described in WO 94/03249. In this process there were mixed in a twin-screw extruder at 210° C. 30 parts by weight (pbw) of polypropylene (type Eltex HCW280®) and 70 pbw of a mixture composed of 80 parts of diisodecyl phthalate and 20 parts of castor oil. The solution was extruded through a spinneret plate with orifices of 1.2 mm, whereupon the resulting cable strand was laid on a cooling belt and the chopped up into beads of about 1 mm long.

Finally, in a manner analogous to that given for the preparation of P4 a type P5 was prepared, with activated carbon of the Norit SA Super® type being used as adsorbent. To this end 30 pbw of polypropylene (type Eltex HCW280®) and 30 pbw of activated carbon (type SA Super®, ex Norit; BET 900 m²/g; 3%>150 µm, 40%<10 µm) were mixed with 40 pbw of a mixture composed of 80 parts of diisodecyl phthalate and 20 parts of castor oil.

Types P6 and P7 were prepared in an analogous manner, with the proviso that P6 contained 15 wt. % of activated carbon and P7 contained 15 wt. % of Ambersorb 563® Furthermore, types P8 through P11 were prepared in an analogous manner, containing silicalite EZ072 as an adsorbent.

The composition of types P4 through P7 is listed in Table 2.

TABLE 2

| type with oil-filled matrix and, optionally, adsorbent | adsorbent | matrix | wt. % adsorbent/-matrix | wt. % diisodecyl phthalate/castor oil (80/20) |
|---|---|---|---|---|
| P4 | none | polypropylene | 0/30 | 70 |
| P5 | activated carbon | polypropylene | 30/30 | 40 |
| P6 | activated carbon | polypropylene | 15/30 | 55 |
| P7 | Ambersorb 563 ® | polypropylene | 15/30 | 55 |
| P8 | silicalite EZ072 | polypropylene | 5.0/25.3 | 69.7 |
| P9 | silicalite EZ072 | polypropylene | 14.9/29.9 | 55.2 |
| P10 | silicalite EZ072 | polypropylene | 16.2/24.8 | 59.0 |
| P11 | silicalite EZ072 | polypropylene | 25.0/20.0 | 55.0 |

Example I

The example below shows how the adsorption capacity of adsorbents filled with extraction liquid (oil) for a particular type of contaminant can be determined. The measurements were performed with methylene chloride (DCM) as contaminant in water at concentrations ranging from 0.1 to about 5,000 ppm and are the result of a number of shaking tests in which a certain quantity of adsorbent was added to a measured quantity of water with a known quantity of methylene chloride dissolved therein. The mixture of solution and adsorbent in each case was stirred for 24 hours, after which the remaining concentration of methylene chloride was again determined. From the difference in concentration the quantity of methylene chloride adsorbed by the adsorbent could be calculated. By varying both the quantity of adsorbent and the starting concentration over a wide concentration range the capacity of the particles as a function of the equilibrium concentration could be determined. The result of the measurements is shown in FIG. 1.

Example II

In the example below three columns were compared, one filled with extracting synthetic particles without adsorbent and the two others holding extracting synthetic particles with adsorbent, and it was shown that water treatment with a column containing the latter particles could be continued much longer before breakthrough occurs and that the column has to be regenerated.

The experiment was carried out using, on the one hand particles filled with extracting agent without an adsorbent being present (P4) and, on the other, particles into which in addition to an extracting agent an adsorbent was incorporated: either 15 wt. % Ambersorb 563 (P7) or 16 wt. % silicalite EZ072 (P10).

Figure 2:
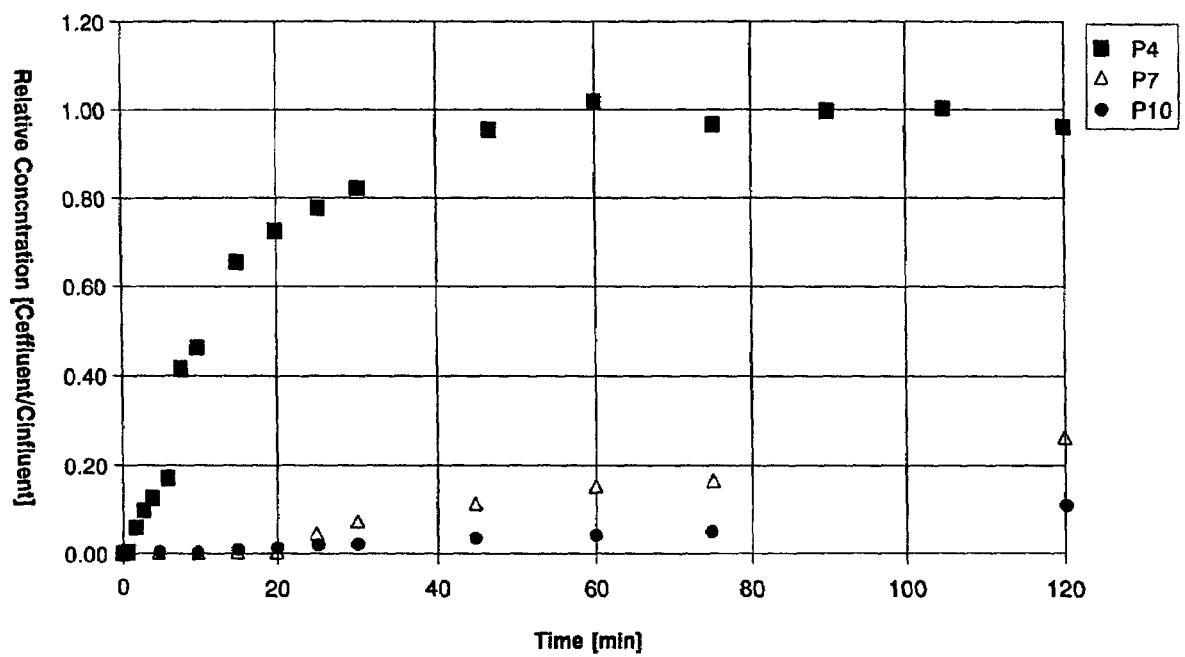
FIG. 2, associated with Example 2, shows a comparison of performance when using particles without adsorbent and when use was made of particles containing an adsorbent as well as an extracting agent.

FIG. 2 clearly shows that under virtually comparable conditions breakthrough occurred much more quickly when particles without adsorbent (P4) were used than when use was made of particles containing an adsorbent as well as an extracting agent (either P7 or P10).

The quantity of adsorbent, the rate of flow of water to the column, and the methylene chloride concentration during the three experiments are listed in Table 3. The internal diameter of the columns used in these experiments was 5 cm.

TABLE 3

| type of particle | P4 | P7 | P10 |
|---|---|---|---|
| quantity of particles, g | 175 | 185 | 202 |
| water rate of flow to column, l/h | 7.3 | 6.5 | 6.6 |
| influent concentration DCM, ppm | 40 | 55 | 48 |

The breakthrough curve, where the effluent concentration divided by the influent concentration is plotted against the time is shown in FIG. 2 for the three particles (P4, P7 and P10).

Example III

In the example below it is shown that the adsorption capacity of adsorbents and the extraction capacity of the extracting agent used do not decrease (or hardly decrease) when the adsorbent is wholly or partially embedded in an extraction liquid.

For the results shown in FIG. 1 the adsorption capacity of the adsorbent used in these particles was determined and this capacity was compared with the capacity of the pure adsorbent as determined experimentally.

For the determination of the adsorption capacity it was determined first of all how much methylene chloride is incorporated into the diisodecyl phthalate present in the particle under the given circumstances, based on the measured distribution equilibria. Next, the adsorption capacity of the adsorbent in the particle is determined by dividing the remaining quantity of DCM by the quantity of adsorbent that is present. The thus determined adsorption capacity of the adsorbent in the particle is compared with the capacity of pure adsorbent.

Figure 3:
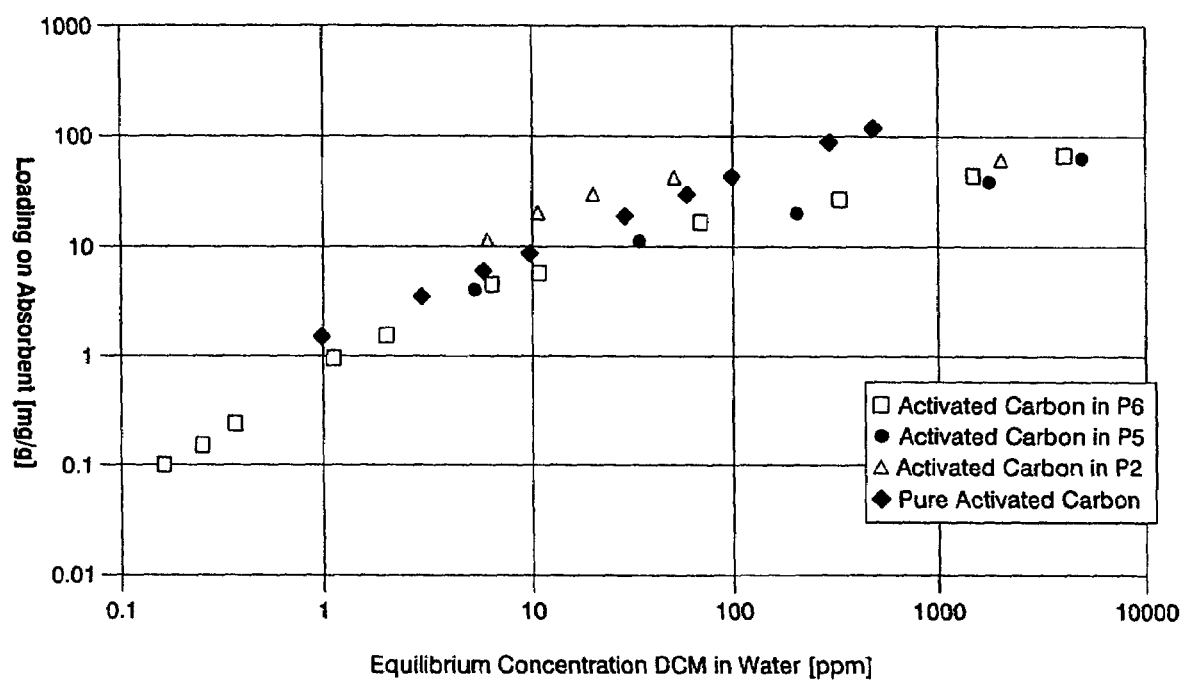
FIG. 3, associated with Example 3, shows the capacity for activated carbon covered with extracting agent as well as the capacity of pure activated carbon for comparative purposes.

FIG. 3 shows the thus determined capacity for activated carbon covered with extracting agent as determined in the particles P2, P5, and P6, as well as the capacity of pure activated carbon for comparative purposes.

Figure 4:
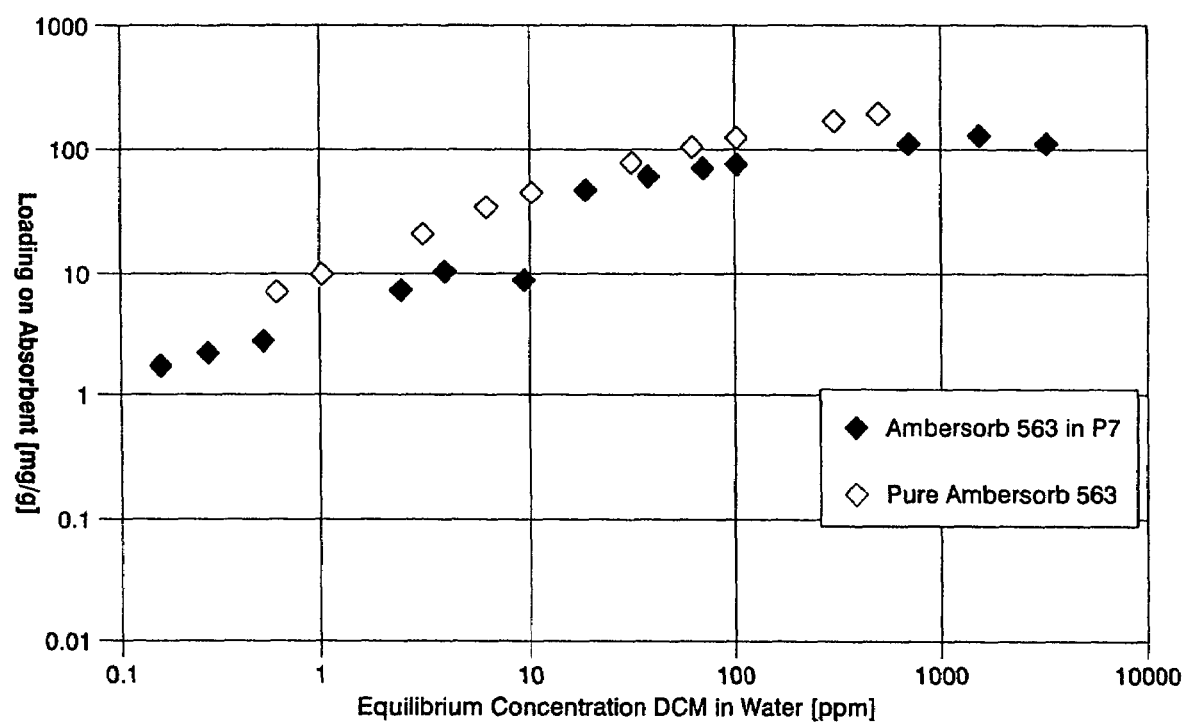
FIG. 4, associated with Example 3, shows the capacity of pure Ambersorb® 563 and of Ambersorb® 563.

FIG. 4 shows the capacity of pure Ambersorb® 563 and of Ambersorb® 563 as present in particle P7.

It is clear from FIGS. 3 and 4 that the adsorbent properties of the adsorbent are retained virtually completely when the adsorbent is covered with extraction liquid.

Comparison Example

To illustrate the difference in particle capacity it was determined how much adsorbent is required to achieve a desired reduction of the concentration.

The required quantity of adsorbent covered with oil or not for effecting a change in concentration from 1,000 to 10 ppm DCM in a stirred vessel containing 1 m³ (1,000 kg) of water is shown in Table 4:

TABLE 4

| type with matrix filled with oil and, optionally, adsorbent | adsorbent | matrix | wt. % adsorbent/ matrix | wt. % diisodecyl phthalate, or (80/20) diisodecyl phthalate/castor oil | kg adsorbent required for change in concentration from 1,000 to 10 ppm DCM |
|---|---|---|---|---|---|
| P2 | activated carbon | none | 42.5 | 57.5 | 90 |
| P4 | none | polypropylene | 0/30 | 70 | 5,440 |
| P5 | activated carbon | polypropylene | 30/30 | 40 | 570 |
| P6 | activated carbon | polypropylene | 15/30 | 55 | 1,465 |
| P7 | Ambersorb 563 ® | polypropylene | 15/30 | 55 | 350 |

Example IV

This example again shows that the adsorption capacity of adsorbents and extraction capacity of the extracting agent used do not decrease (or hardly decrease) when the adsorbent is wholly or partly embedded in an extraction liquid. The methylene chloride adsorption capacity of silicalite as present in the particles P8 through P11 was determined and this capacity was compared with the capacity of the pure adsorbents as determined experimentally, in a similar manner as described in Example III. It was determined how much methylene chloride is incorporated into the diisodecyl phthalate present in the particle under the given circumstances, based on the measured distribution equilibria. Next the adsorption capacity of the zeolite in the particle was determined by dividing the remaining quantity of DCM by the quantity of adsorbent that is present. The thus determined adsorption capacity of the adsorbent in the particle was compared with the capacity of pure adsorbent.

Figure 5:
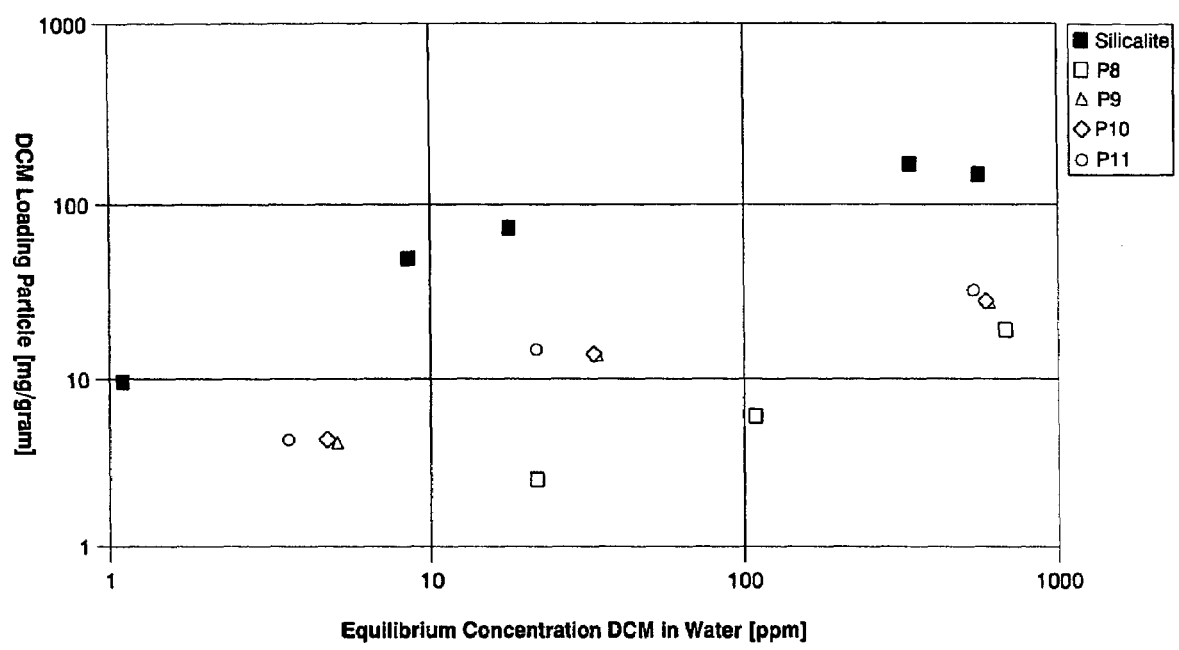
FIG. 5, associated with Example 4, shows the capacity of particles P8 through P11 and of pure silicalite.
Figure 6:
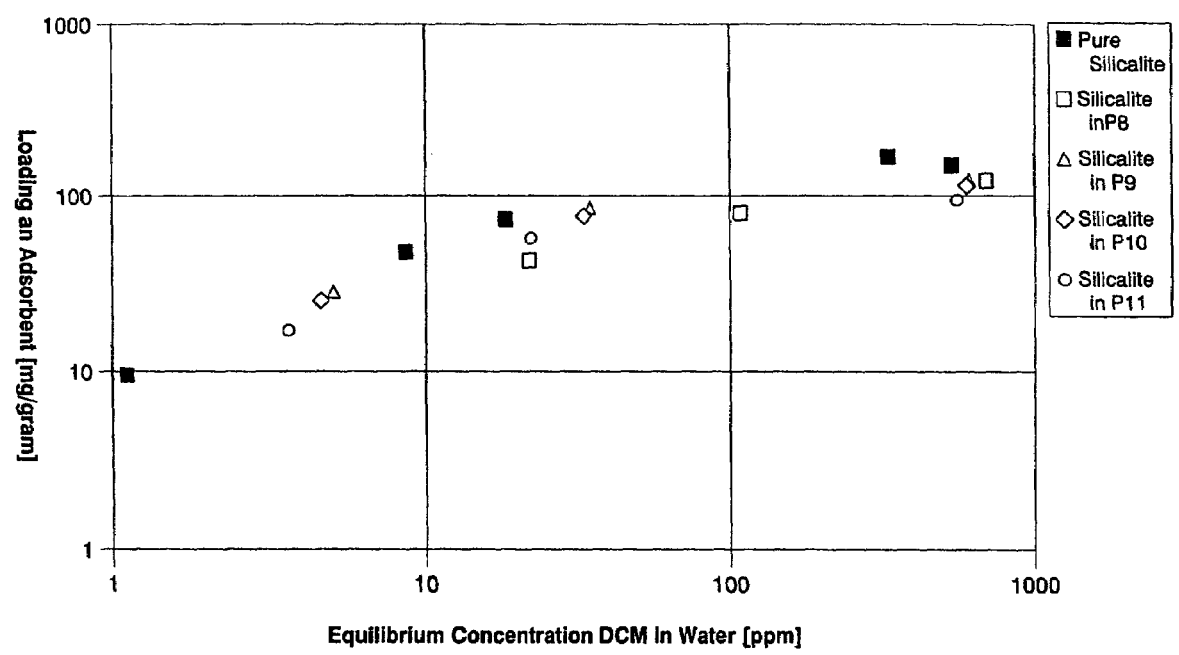
FIG. 6, associated with Example 4, shows the capacity of silicalite in P8 through P11 and again for pure silicalite.

FIG. 5 shows the capacity of particles P8 through P11 and of pure silicalite, and FIG. 6 shows the capacity of silicalite in P8 through P11 and again for pure silicalite. It is clear from FIG. 6 that the adsorbent properties of the silicalite EZ072 were retained virtually completely when the adsorbent was covered with extraction liquid.

The invention claimed is:

1. A process for the removal of liquid, gaseous and/or dissolved constituents from a process stream, comprising contacting the process stream with an adsorbent comprising a first porous material and which has been incorporated into a second porous material, and wherein at least 30 vol. % of the pores of the first and second porous materials of which is filled with an extraction liquid including paraffin oil and a dialkyl phthalate with an alkyl group having eight to sixteen carbon atoms, and where the affinity between the adsorbent and the constituents to be removed exceeds the affinity between said constituents and the extraction liquid.

2. The process according to claim 1 wherein at least 50 vol. % of the pores is filled with an extraction liquid.

3. The process according to claim 1 wherein at least 90 vol. % of the pores is filled with an extraction liquid.

4. The process according to claim 1 wherein the amount of adsorbent is at least 2.5 wt. %, calculated on the overall solids content.

5. The process according to claim 1 wherein the adsorbent is selected from the group of activated carbon, zeolites, carbonized sulphonated cross-linked polystyrene, and cross-linked polystyrene.

6. The process according to claim 1 wherein the adsorbent comprising the first porous material is incorporated into the second porous material obtained by dissolving a polymer as the second porous material in one or more liquid and miscible compounds at a temperature above the upper critical phase separation temperature Tc in the presence of 2.5 to 80 wt. %, calculated on the overall solids content, of a first porous material with adsorbent properties which is solid at said temperature, followed by a lowering of the temperature and the forming of a fibre, film, granulate or powder from the polymer filled with the liquid compounds, optionally followed by the removal of at least part of the liquid therefrom an by refilling or filling up with an extraction liquid to at least 30% of the pore volume.

7. The process according to claim 6 wherein the weight percentage of the adsorbent amounts to 20 to 60 wt. % of the overall solids content.

8. The process according to claim 6 wherein the weight ratio of adsorbent to extraction liquid is in the range of 1/10 to 2/1.

9. The process according to claim 1 wherein the adsorbent or the second porous material into which the adsorbent has been incorporated is present in the form of a granulate or powder having a particle size of 0.1 to 10 mm.

10. The process according to claim 1 wherein the material after becoming saturated with the constituent to be extracted is regenerated with steam.

11. A process for the removal of liquid, gaseous and/or dissolved constituents from a process stream, comprising contacting the process stream with an adsorbent comprising a first porous material and which has been incorporated into a second porous material at least 30 vol. % of the pores of the first and second porous materials of which is filled with an extraction liquid comprising diisodecyl phthalate, and where the affinity between the adsorbent and the constituents to be removed exceeds the affinity between said constituents and the extraction liquid.

12. A process for the removal of liquid, gaseous and/or dissolved constituents from a process stream, comprising contacting the process stream with an adsorbent comprising a first porous material and which has been incorporated into a second porous material, and wherein at least 30 vol. % of the pores of the first and second porous materials of which is filled with an extraction liquid including paraffin oil and a dialkyl phthalate with an alkyl group having eight to sixteen carbon atoms, and where the affinity between the adsorbent and the constituents to be removed exceeds the affinity between said constituents and the extraction liquid, and wherein the adsorbent is selected from the group consisting of activated carbon, zeolites, carbonized sulphonated cross-linked polystyrene, and cross-linked polystyrene.

* * * * *

UNITED STATES PATENT AND TRADEMARK OFFICE
CERTIFICATE OF CORRECTION

PATENT NO. : 7,641,800 B2
APPLICATION NO. : 11/165781
DATED : January 5, 2010
INVENTOR(S) : van Strien et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 134 days.

Signed and Sealed this

Sixteenth Day of November, 2010

David J. Kappos
*Director of the United States Patent and Trademark Office*